Figure 4A:
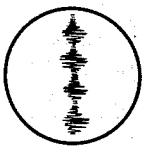

Dec. 19, 1950     J. H. LANCOR, JR     2,534,276

VIBRATION PICKUP DEVICE AND SYSTEM

Filed Jan. 10, 1944

INVENTOR
JOSEPH H. LANCOR, JR.
BY
Herbert H. Thompson
his ATTORNEY.

Patented Dec. 19, 1950

2,534,276

UNITED STATES PATENT OFFICE 2,534,276

VIBRATION PICKUP DEVICE AND SYSTEM

Joseph H. Lancor, Jr., East Williston, N. Y., assignor to The Sperry Corporation, a corporation of Delaware Application January 10, 1944, Serial No. 517,657

1 Claim. (Cl. 73—35)

My invention relates to vibration pick-up devices in general and their use in vibration detecting systems, and concerns itself primarily with vibration pick-up devices of the magnetostrictive type.

As an object of my invention, I wish to provide a vibration pick-up device in which changes in the physical characteristics of a vibratory mass vary the number of magnetic lines threading a coil to induce therein electromotive forces which are proportional to higher order derivatives of the vibrations occurring in a vibratory member.

It is also an object of my invention to provide a magnetostrictive vibration pick-up device which may be used in connection with a detonation or other impact or shock detecting system and which is adaptable for external mounting on the apparatus in which the detonation or shock is to be detected.

Another object of my invention is to provide a vibration pick-up device which is adaptable for use in connection with a detonation detection system and which is capable of producing electromotive forces proportional to the rate of change of vibratory accelerations.

It is a further object of my invention to provide a magnetostrictive vibration pick-up device in which the magnetostrictive element thereof is permanently magnetized (or at least in a permanent magnetic field) and is assembled in a mount in such a manner that the physical characteristics of the said magnetostrictive element are changed in response to vibrations of a vibrating member, said changes effecting a change in the number of magnetic lines threading a coil associated therewith to induce in said coil an electromotive force proportional to the vibrations of the vibrating member.

It is a further object of my invention to provide a vibration pick-up device in which a wire coil is associated with a permanent magnet whose lines of force form a magnetic circuit which interlinks said coil and in which is interposed a magnetostrictive element arranged to be responsive to the vibrations of a vibrating member. Moreover, the magnetostrictive element is selected to have a natural frequency of vibration higher in order that the frequencies of vibrations to which it is responsive, and is operable to alter the number of magnetic lines threading said coil in accordance with changes in the permeability of the element due to stresses set up by external vibrations.

Yet another object of my invention is to provide a detonation system in which a magnetostrictive pick-up device is arranged for external mounting on a cylinder or a metal part subject to an impact in which detonation is to be detected and which is associated with a cylinder selector switching means, a variable timing means, an amplifying device, and a visual indicating means, in such manner that the phenomenon of detonation may be observed and indicated as occurring in individual cylinders or in a plurality of cylinders and which may be isolated from other vibration patterns set up in the cylinder walls due to valve action, etc.

Still another object of my invention is to provide an engine analyzer in which vibrations indicative of conditions capable of causing engine failures and of maladjustments may be detected in their incipient state by means of a magnetostrictive vibration pick-up element mounted on the engine's cylinder walls, and associated with a selector switching device and variable timing means in such a manner that electromotive forces generated in the pick-up devices may be selectively passed to a visual indicating means in which the wave patterns characteristic of maladjustments occurring within the engine may be observed and analyzed.

These and other objects of my invention will become apparent as the description proceeds.

In carrying out my invention in a preferred embodiment thereof, I provide a permanent magnet having a coil associated therewith which is contained in a suitable housing for the entire vibration pick-up assembly. The magnet, which is formed of material exhibiting magnetostrictive properties, is arranged within the housing in a manner such that vibrations in a vibratory member set up stresses therein which change the number of magnetic lines emanating therefrom. This action induces an electromotive force in the coil interlinked by these magnetic lines of force, which alternates at a frequency equal to the frequency of the vibrations of the vibrating member, and with an amplitude which is a function of both the frequency and amplitude of said vibrations. The housing is fitted to receive a standard cable connection and a part of the base of the unit is shaped into a stud for mounting the device at a point where vibrations are to be detected. Through a cable connection provided, the electromotive forces generated in the coil are passed to a conductor and are thus made available for appropriate uses, such as telemetric indication.

Figure 4B:
Figure 4C:
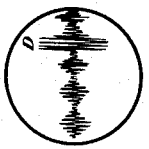

A more comprehensive understanding of my invention will be afforded from the following detailed description and the accompanying drawing in which:

Fig. 1 is a cross-sectional view of a vibration pick-up device embodying my invention;

Fig. 2 a similar view showing a modified form of my invention;

Fig. 3 a schematic diagram of a detonation indicating and motor analyzing system; and Figs. 4A, 4B and 4C are characteristic vibration patterns which may be detected by my improved pick-up device. Like references have been used throughout in the drawings to designate like parts.

In a preferred embodiment of my invention illustrated in Fig. 1, a shell or housing 11 is internally threaded to receive a base member 12 which is provided with a stud 13 for engagement in a vibrating member 14, such as an engine cylinder wall. A copper cover washer 15 may be carried on the base member 12 to provide a seal between said base member and shell 11. A magneto-strictive element 16, which is permanently magnetized and is preferably of a material known under the trade name of "Alnico," is staked into a steel assembly ring 17 which cooperates with an annular shoulder 18 of housing 11. A coil of fine wire 19 is wound about the permanent magnet 16 and is held in place by a coil retainer 21 anchored to the magnet 16. A disc shaped insulating member 24 is interposed between the coil 19 and the steel ring 17, and a channel 25 is provided in the latter for carrying conductor 26 which connects one end of the coil 19 with a silver contact point 27. Wire 26 is insulated from the steel ring 17 by an insulating tube 28. Contact point 27 is mounted in an insulating block of Bakelite 29 and is riveted thereto as at 32. This contact is arranged for a standard conductor connection 33 which is threaded to the pick-up housing 11 by the threads 34 provided on an extended portion 35 thereof. Such arrangement provides a reliable connection between the contact point 27 and the spring-pressed contact point 36 of the connector 33. One end of coil 19 is grounded at the contact point 22.

In the embodiment of my invention illustrated in Fig. 2, a rod 45, which is preferably of an alloy high in nickel content, is threaded at each end. One end of the rod 45 is screwed and staked into a top plate 48 and a coil retainer 49 is positioned in tight engagement with a Duralumin spacer 51. This retainer is staked into position as indicated at point 52. A coil of fine wire 54 is wound around the spacer 51 between the top plate 48 and the coil retainer 49. A permanent magnet 55, which is cylindrical in shape, is placed around the coil assembly and is held in engagement between the top plate 48 and a base 56. The latter member is shaped with a stud portion 57 which carries threads for engagement with any vibratory member to which the pick-up device may be attached. The entire coil assembly and permanent magnet are held in place by the nickel rod 45 which is screwed into the base 56 at point 46, and the sensitivity of the device is determined by the amount of tension imposed upon rod 45 in assembling the coil assembly to the base 56. Terminal points 59 and 61 are provided for receiving electromotive forces induced in coil 54 and the two ends of the latter are connected therewith by conductors, such as 62, which are insulated from the top plate 48 by insulating members 63 and 64. The inertia of plate 49 added to that of magnetostrictive rod 45 increases the vibration stresses set up in said rod and hence the magnetostrictive induced signal in coil 54.

In both of the embodiments of my invention described above, the type of construction and assembly of the units lends itself to ready standardization of the sensitivity of the unit. With particular reference to the embodiment of my invention illustrated in Fig. 1, the housing 11 may be screwed to base 12 with a uniform torque against soft washer 15, thereby clamping the magnetostrictive element 16 tightly between base 12 and ring 17 and, although the sensitivity of the device does not require accurate adjustment of this sort, it is possible to standardize the degree of compression under which the assembly, including element 16, is held. Moreover, the construction illustrated in this particular embodiment of my invention also lends itself to easy standardization of the field strength of the magnet 16. More specifically, element 16 may be assembled in the unit in a demagnetized condition and thereafter be magnetized in the assembled unit. In this manner, the magnet may be standardized by mass production means.

As heretofore stated, the principle of operation upon which both of the above described embodiments of my invention are operative is dependent upon the magnetostrictive characteristics of a vibratory member. The "Alnico" magnet 16 of the embodiment illustrated in Fig. 1 and the nickel rod 45 of the embodiment illustrated in Fig. 2 are responsive to vibrations which are to be detected. The vibrations set up intermittent compressive stresses in these members and thereby alter the number of lines threading the respective coils with which each is associated to induce therein electromotive forces which are of a frequency equal to the frequency of vibrations in the vibrating member.

While the pick-up device described is not limited in use to any particular system, it lends itself to applications and systems in which frequencies of a higher order are to be detected, such as systems for detecting the phenomena of detonation. While I do not wish to limit the application of my invention to any particular use, its operation may be more clearly described in connection with detonation detecting or engine analyzing systems such as that illustrated in Fig. 3. Here pick-up devices embodying my invention and of the type illustrated in Fig. 1 are schematically shown as being mounted on a radial airplane engine. For illustrative purposes, connections from one pick-up device only are shown. This particular device is shown as being mounted on cylinder No. 1 and is connected to a cylinder selecting switch 71 by the conductor 72. A similar conductor 73 is appropriately connected to segment 1 of a timing device 74 which will be described more fully in connection with the actual selection of individual vibration patterns.

By means of the aforementioned conductor 72, the No. 1 pick-up is connected to a contact point 1 of cylinder selector 71 and is also electrically connected to a contact point designated "all." By proper adjustment of the selector pointer 76 a contact point 77 carried on ring connector 78 may be moved into engagement with any desired contact point corresponding to the number of the cylinder desired to be selected. When such operation is effected, a second connector ring 79 is so moved that its contact points 81, 82, etc. are moved into engagement with all other cylinder contact points than the one selected. In this manner the pick-up devices associated with each of the unselected cylinders are grounded through the ground connection 84, which is connected to the connecting ring 79 by a sliding contact 85. Through the operation of cylinder selector switch 71, therefore, each pick-up device selectively or all of them sequentially may be selectively connected, through a conductor 86, to terminal 87 of a test switch 88.

As illustrated for cylinder No. 1 each pick-up device is connected to its appropriate segment of the timing device 74 as by a conductor 73 for cylinder No. 1. Timing device 74 has a brush arm 91 on which is carried a brush 92 arranged to be in slidable engagement with the respective segments 1, 2, 3, etc. of the segment ring 94. Arm 91 is driven through appropriate gear mechanisms 95 from a take-off which is attached to the engine's tachometer drive, and for a four-cycle engine moves the arm 91 one revolution for each two revolutions of the engine's crankshaft. Contact arm 91 is electrically connected by means of a conductor 96 to terminal 97 of test switch 88. Terminals 98 and 99 of test switch 88 are respectively connected to terminals 102 and 103 of an amplifying device 104, which is schematically shown as comprising one stage of amplification. From amplifier 104 through the plug means 105 the output of this device is conducted either to an indicator 106, such as a neon tube, or to an oscilloscope 107, or both.

By closing the test switch 88 to terminal 87 and open terminal 101, the timing device 74 may be open-circuited. The electromotive forces induced in the pick-up devices of each cylinder will then pass to cylinder selector 71 directly, thence to amplifier 104, and thence to the indicator 106 or to the oscilloscope 107.

In operation, the pick-up device illustrated in Fig. 1 is mounted on a boss provided on the wall of the engine cylinder and when rigidly screwed thereto vibrates with the cylinder wall. Since the vibrations produced by the phenomena of detonation are usually in the order of approximately $10^4$ cycles per second and have an amplitude of approximately $10^{-8}$ inch, it is possible for the pick-up device embodying my invention to discriminate between vibrations of considerably larger amplitude and lower frequencies. The mass of the magnet 16, which in this particular embodiment of the invention is also the magnetostrictive element, is so selected that the magnet has a natural frequency of vibration in excess of the frequencies produced from detonation within a cylinder wall. Because of this fact, the pick-up device operates, in a sense, as an accelerometer and electromotive forces are induced in the coil winding 19 which are proportional to higher order derivatives including at least the third derivative of the vibrations set up by detonation. As will be apparent to one skilled in the art, it is, of course, possible to provide a system, such as that described, with filter circuits which will render the system inoperative to pick up the large amplitude, low frequency vibrations that interfere with the study of detonation. Such precaution is not necessary, however, in a system provided with my pick-ups since the mass and dimensions of the magnetostrictive element may be so chosen as to make it responsive only to higher order derivatives of the vibrations detected. The electromotive forces generated in each of the pick-up devices are produced by a change in the number of magnetic lines threading the coil and emanating from the magnetostrictive magnet 16. This change is produced by the stresses set up in this element by the compressions resulting from the vibration of the cylinder wall and transmitted through the stud mounted base of the pick-up device. Due to the change in the number of line interlinking the coil, electromotive forces are induced in the latter and are transmitted to the connecting means provided for the pick-up to the selector switch 71 and timing device 74 as described above.

The operation of the pick-up device illustrated in Fig. 2, is identical with that explained for the pick-up device in Fig. 1, with the exception that the coil 54 of this device is associated with a permanent magnet 55 which provides magnetic lines of force for threading both the coil and the magnetostrictive element 45. The latter element is inserted in the magnetic circuit to change the number of magnetic lines inter-linking the coil as in the previously explained embodiment. The vibrations within the cylinder wall are transmitted to the rod 45 which has a natural frequency of vibration in excess of those detected and its physical characteristics are altered thereby. Due to these vibratory forces, its permeability is changed and accordingly the number of lines forming the magnetic circuit and linking the coil are changed in accordance with the changes in permeability of the rod. In this form of the invention the cylindrical magnet 55 is held under compression by the tension in rod 45, as explained hereinbefore.

In this particular embodiment of my invention, the field strength of the magnet 55 should be maintained at a level such that the magnetostrictive rod 45 will not become saturated.

With either embodiment in use in the system illustrated in Fig. 3, electromotive forces are induced in the various pick-ups which are selectively passed by the cylinder selector switch 71 to the amplifier 104, where they are amplified for transmission to the oscilloscope 107. The cylinder selector switch, as explained above, provides a means for studying the vibrations of any one single cylinder of the engine at a time or for studying the vibrations in all cylinders. If the electromotive forces that are generated in the various pick-up devices are transmitted from the amplifier to an oscilloscope and reproduced on the screen thereof, vibration patterns such as those illustrated in Fig. 4A, 4B and 4C, may be observed. The combustion patterns only for a plurality of cylinders firing sequentially may take the form of the vibrations shown in Fig. 4A, if combustion in all cylinders is normal. In such case, test switch 88 is closed to the contact points 97 and 100, and timing device 74 is in control of the circuit. If the cylinder selector switch 71 is adjusted to select a certain cylinder and test switch 88 is closed to contacts 87 and 101, the vibration pattern of that cylinder will appear as shown in Fig. 4B and will be made up of component vibration waves due to the exhaust valve, the intake valve, combustion vibrations and background vibrations. Those bracketed and designated E are due to the exhaust valve, I to the intake valve, C to combustion vibrations, and B to background vibrations.

In testing an engine for detonation, it is obviously necessary to eliminate the indication of all vibrations with the exception of those due to combustion, since it is in this part of the cycle that detonation occurs. To effect the elimination of all portions of the wave pattern with the exception of that attributable to combustion is the function of the timing device 74, which permits the electromotive forces generated by the various pick-up devices to pass only for a predetermined period of time starting soon after initial combustion has taken place within the cylinder. Thus when selector switch 71 is turned to select a given cylinder the pick-ups of all other cylinders will be grounded and the pick-up of the selected cylinder only will pass current to the timer 74. Since the latter is timed to pass current during the combustion cycle only, only the combustion pattern at that cylinder will appear on the screen of oscilloscope 107.

Timing device 74 is adjustable, and various settings are possible by rotating the segmented ring 94 in the screw and slot arrangement 115 provided. Through this adjustment, the timing device may be conditioned to pass the voltages generated in the various pick-up devices of each cylinder for a period coincident with the occurrence of vibrations from various sources. For example, the vibrations attributable to combustion only may be selected. When the timer 74 is thus adjusted and when cylinder selector switch 71 is set to the "all" position, a vibration pattern, such as that illustrated in Fig. 4A will be observed on the screen of the oscilloscope. It is to be noted here that the amplitude of vibrations occurring within each cylinder wall are approximately the same and normal combustion is thereby indicated. The number of combustion vibration patterns indicated here is illustrative only and in actual practice a number in keeping with the number of cylinders firing will be present on the screen of the oscilloscope.

Should any one cylinder of the engine be operating under conditions which will cause detonation, vibrations will be set up in the cylinder which are of greater amplitude than those produced by the combustion waves. In this manner, a detonation wave pattern may be observed on the oscilloscope screen, such as that indicated at D in Fig. 4C. By proper manipulation of the cylinder selector switch 71, each of the cylinders may be tested individually or all of the cylinders tested collectively for detonation.

In aircraft applications, where the detection of detonation is of considerable importance, it is often not feasible to burden the pilot with the duty of observing on the screen of an oscilloscope the various vibration patterns, nor it is feasible in some installations to encumber the plane with the added weight of an oscilloscope. In these cases, an indicator such as that illustrated as the neon tube 106 in Fig. 3 may be provided on the panel-board of the plane and the amplifier 104 adjusted to the proper gain so that the tube will be fired to give an indication of the presence of detonation.

The system illustrated in Fig. 3, in addition to acting as a detonation indicator, is also adaptable for uses involving the detection of certain engine maladjustments which are not discernible without dismantling the engine. They may thus be observed in their incipient state and corrected before serious engine failure. In such application, the pick-up may be rigidly mounted at suitable places on the engine or the stud (13 or 57) used as a probe and portably applied at these points. Thus, certain combinations of vibration patterns may be studied and compared with a norm. Information may be obtained also from the pick-ups mounted for detonation detection. For example, if the exhaust vibration pattern illustrated in Fig. 4B is observed to be intermittent for any one cylinder in the engine, it may be concluded with certainty that the exhaust valve is sticking, is operating with excessive clearance, or that both of these conditions are present. The same is true for the intake valve. If all the phenomena that is observed is received in timed relationship with a time sweep, it is possible to observe whether or not known vibrations are occurring in their proper sequence. If spurious vibrations are observed at these points, they provide evidence that the engine is operating under conditions of maladjustment and by proper analysis many of these conditions may be localized.

Modifications of my invention are, of course, possible and may suggest themselves in view of the foregoing disclosure. Accordingly, the representations and descriptions herein made are to be considered illustrative and no wise in a restrictive sense, and my invention both as to spirit and scope is to be limited only by the appended claim. It is to be understood, however, that claims directed to the detonation detector per se, more particularly, that form of detector shown in Fig. 2 have been divided out of this application and are covered in my divisional application Serial No. 130,979, filed December 3, 1949 for Vibration or Impact Indicator, which is copending herewith.

What is claimed is:

An engine analyzer for a cyclically operable engine having a vibration pick-up device mounted on each cylinder to generate electrical signals proportional to the frequency and amplitude of vibrations occurring in the cylinder on which it is mounted, said analyzer comprising means to transmit signals from each pick-up device to a corresponding contact on a timing device, said timing device including means rotated in synchronism with the engine to engage said contacts in firing order during the same portion of each cylinder cycle, means to adjust the contacts relative to the rotating means whereby such engagement is made during a desired portion of the combustion period of each cylinder cycle, means to transmit the signals received by the rotating means, additional means to transmit signals from each pick-up device to a corresponding contact on a selector switch, said selector switch including means settable to select the signal from any desired cylinder and to suppress the signals received from all other cylinders, means to transmit the selected signal, indicating means operable by signals received from the selector switch or the timing device, and switching means to connect the indicating means with the output of the selector switch or the timing device.

JOSEPH H. LANCOR, Jr.

REFERENCES CITED

The following references are of record in the file of this patent:

UNITED STATES PATENTS

| Number | Name | Date |
|---|---|---|
| 1,335,238 | Hopkins | Mar. 30, 1920 |
| 1,834,498 | Parshall | Dec. 1, 1931 |
| 1,882,401 | Pierce | Oct. 11, 1932 |
| 1,907,415 | Carpenter et al. | May 2, 1933 |
| 2,031,789 | Pierce | Feb. 25, 1936 |
| 2,113,376 | Janco | Apr. 5, 1938 |
| 2,116,522 | Kunze | May 10, 1938 |
| 2,153,571 | Kallmeyer | Apr. 11, 1939 |
| 2,238,234 | Starsfield | Apr. 15, 1941 |
| 2,269,760 | Eldredge | Jan. 13, 1942 |
| 2,275,675 | Draper et al. | Mar. 10, 1942 |
| 2,291,045 | Lancor | July 28, 1942 |
| 2,319,219 | Draper et al. | May 18, 1943 |
| 2,435,031 | Burns et al. | Jan. 27, 1948 |